United States Patent
Langstaff et al.

(10) Patent No.: US 10,175,039 B2
(45) Date of Patent: Jan. 8, 2019

(54) AUTHENTICATION OF ARTICLES BY WHITE LIGHT INTERFEROMETRY AND BIREFRINGENCE

(75) Inventors: Stephen Langstaff, Wigton (GB); Robert Stewart, Wigton (GB)

(73) Assignee: INNOVIA FILMS LIMITED, Wigton, Cumbria (GB)

( * ) Notice: Subject to any disclaimer, the term of this patent is extended or adjusted under 35 U.S.C. 154(b) by 296 days.

(21) Appl. No.: 13/814,454

(22) PCT Filed: Sep. 9, 2011

(86) PCT No.: PCT/GB2011/051696
§ 371 (c)(1),
(2), (4) Date: Feb. 26, 2013

(87) PCT Pub. No.: WO2012/032361
PCT Pub. Date: Mar. 15, 2012

(65) Prior Publication Data
US 2013/0155421 A1 Jun. 20, 2013

(30) Foreign Application Priority Data
Sep. 10, 2010 (GB) .................................. 1015117.3

(51) Int. Cl.
*G01B 11/06* (2006.01)
*G07D 7/12* (2016.01)
*G07D 7/164* (2016.01)

(52) U.S. Cl.
CPC .............. *G01B 11/06* (2013.01); *G07D 7/12* (2013.01); *G07D 7/164* (2013.01)

(58) Field of Classification Search
None
See application file for complete search history.

(56) References Cited

U.S. PATENT DOCUMENTS

| | | | |
|---|---|---|---|
| 2,519,546 A * | 8/1950 | Colbert | G02B 5/26 359/584 |
| 3,753,822 A * | 8/1973 | Heinrich | B29D 11/00634 156/101 |
| 5,095,210 A * | 3/1992 | Wheatley et al. | 250/339.05 |
| 5,737,298 A | 4/1998 | Suhan | |
| 6,171,443 B1 * | 1/2001 | Goettmann et al. | 162/135 |
| 6,228,316 B1 * | 5/2001 | Moseley, III | 264/509 |
| 6,343,745 B1 * | 2/2002 | Bohm | G06K 19/06196 235/493 |
| 2002/0005953 A1 * | 1/2002 | Negami et al. | 356/445 |
| 2002/0172807 A1 * | 11/2002 | Ridyard | B32B 15/08 428/195.1 |
| 2002/0192418 A1 * | 12/2002 | Zadjman et al. | 428/42.1 |
| 2004/0246493 A1 | 12/2004 | Kim et al. | |
| 2005/0109984 A1 | 5/2005 | Potyrailo et al. | |
| 2006/0187452 A1 | 8/2006 | Wang | |
| 2007/0018001 A1 * | 1/2007 | Yesildag et al. | 235/487 |
| 2008/0106725 A1 * | 5/2008 | Schuetzmann et al. | 356/71 |
| 2010/0320371 A1 * | 12/2010 | Agrawal et al. | 250/271 |
| 2011/0049862 A1 * | 3/2011 | Hill | 283/70 |

FOREIGN PATENT DOCUMENTS

| | | |
|---|---|---|
| JP | 2005254643 | 9/2005 |
| WO | 2005086099 A1 | 9/2005 |
| WO | 2007072426 A2 | 6/2007 |
| WO | 2009/133390 A1 | 11/2009 |
| WO | WO 2009133390 A1 * | 11/2009 |
| WO | 2010/001165 A1 | 1/2010 |

OTHER PUBLICATIONS http://en.wikipedia.org/wiki/In-mould_labelling, "In-mould labelling", as printed Jul. 12, 2010, pp. 1-3.
International Search Report and the Written Opinion of the International Searching Authority of International Application No. PCT/GB2011/051696 dated Jan. 19, 2012.
Combined Search and Examination Report under Sections 17 and 18(3) of Application No. GB1015117.3 dated Dec. 9, 2010.

* cited by examiner

*Primary Examiner* — Violeta A Prieto
(74) *Attorney, Agent, or Firm* — Ping Wang; Morris, Manning & Martin, LLP

(57) ABSTRACT

The present invention provides a method of authenticating the provenance of an article marked with a removable transparent polymer film comprising measuring the thickness of the removable transparent film while still located on the article or of a layer within the film while still located on the article by white light interferometry. Alternatively, or in addition, the method comprises measuring the birefringence of the removable transparent polymer film while still located on the article or of a layer within the film while still located on the article.

8 Claims, No Drawings

AUTHENTICATION OF ARTICLES BY WHITE LIGHT INTERFEROMETRY AND BIREFRINGENCE

This application is a national stage application of International Patent Application No. PCT/GB2011/051696, filed Sep. 9, 2011, which claims priority to United Kingdom Application Nos. 1015117.3, filed Sep. 10, 2010. The entirety of all of the aforementioned applications is incorporated herein by reference.

FIELD

The present invention relates to a method of authenticating articles. More specifically, the present invention provides a method for determining whether an article having a security feature in the form of a polymeric film provided thereon is genuine or is an unauthorised reproduction. The invention also provides a detection unit for carrying out such methods.

BACKGROUND

It is well known that high value articles are prone to counterfeiting. With improvements in technology and counterfeiter skill, it has become increasingly difficult to visually distinguish many counterfeit goods from their genuine counterparts.

Numerous steps have been taken to allow genuine articles to be authenticated. For example, unique batch numbers, holograms, or bar codes may be printed or adhered to the articles. Additionally, 'track and trace' technology may be employed, where a product has a unique code, which enables its current and past locations, as well as other information, to be determined.

One drawback associated with the use of these visible security features is that counterfeiters will often seek to either copy or generate batch numbers or codes which appear, at least at first glance, to be authentic.

It would be desirable to provide a method which enables the rapid and simple authentication of articles using features which are not readily apparent to a counterfeiter and which, even if identified, cannot be readily reproduced.

We have addressed previously issues concerning the ability to authenticate polymeric films as security documents, bank notes and the like in our WO 2009/133390, which discloses a method for authenticating a polymer film by white light interferometry or by birefringence. Whilst this disclosure also contemplates the authentication of objects comprising polymeric films, for example as wrappers of or attachments to an item, it is not contemplated in this document to provide means for the authentication of articles whilst still marked in some way (for example by means of a wrapper or an attachment) with the film. In other words, WO 2009/133390 contemplates only authentication of the films themselves or objects such as banknotes and the like comprising the films, or objects such as wrappers of or attachments to an item after removal from the item; and not of articles themselves marked with the films. Consequently, WO 2009/133390 fails to recognise that the surface of an article marked with a film may itself form a reflective surface from which light may reflect back from a light source and towards a detector. WO 2009/133390 only contemplates that the film itself, or a layer therein, may form a reflective surface.

WO 2007/072426 discloses a method of manufacturing a polarization retardant film and to the use of such a film in security applications.

US 2006/0187452 discloses methods for determining the birefringence level of optical material such as polymeric film.

U.S. Pat. No. 5,737,298 discloses a technique for verifying the authenticity of a particular breed of pirated optical discs using a polarimeter.

JP 2005254643 discloses a multilayer transparent film having a blue shift property in which film of two different refractive indices is sequentially laminated.

US 2005/0109984 discloses a method for authenticating that a test polymer is an authenticatable polymer using a thermochromic compound.

WO 2005/086099 discloses a currency genuineness detection system using a plurality of opto-electronic sensors with both transmission and reflectance properties.

DETAILED DESCRIPTION

From a first aspect, the present invention provides a method of authenticating the provenance of an article marked with a transparent polymer film comprising measuring the thickness of the film or of a layer in the film by white light interferometry.

In the method of the invention, we are expressly concerned with authenticating the provenance of articles marked with films, and not merely of the films themselves—although it is the marking of the article with the film that allows the provenance of the article to be authenticated. Consequently, the thickness measurement in the method of the invention takes place whilst the article is marked with the film. If the film is removed from the article prior to measurement, the article is no longer marked with the film and consequently such a method does not form part of this invention, contemplated though it may be in WO 2009/133390.

As discussed in our previous publication WO 2009/133390, the contents of which are incorporated by reference, transparent thin film materials reflect from both forward and rear surfaces; light reflected from both of these surfaces will differ in path lengths by a distance determined by the thickness of the transparent layer and the angle of incidence of the light. The reflected light waves will therefore undergo phase changes related to the path length differences. A path length difference equal to $[(2n+1)*\lambda/2$ of a beam of light (where n=0, 1, 2, 3 . . . and $\lambda$=wavelength) will cause the returning waves to be completely out of phase and will therefore result in destructive interference, cancelling out any reflected light. A path length difference equal to iii will cause the returning light waves to be completely in phase with one another in a state known as constructive interference, whereby the returning light is twice as intense as before. Path lengths between these two conditions will cause intermediate degrees of intensification or cancelling out of returning light. Interferometry is a series of techniques which utilise the above phenomena to measure distances and thicknesses of materials.

Monochromatic interferometry uses a single wavelength source to measure a single interfering response. This technique works well in applications such as surface profilometry or in the measurement of thin optical films where the thickness of the substrate is reasonably well known. However, its use as a method of security verification is limited by the small amount of data returned (a single interference pattern) and the possibility that the resulting patterns could be generated by quite different thicknesses (the above formulae illustrate that the same interference can be generated by path lengths of $\lambda 2$, $3\lambda/2$, $5\lambda/2$, $7\lambda/2$ ... ).

In contrast to monochromatic interferometry, white light interferometry is used in the present invention. The applicant has found that it is most suitable for measuring multiple layered polymer films in security applications. White light interferometry measures the interference pattern generated by a material across a wavelength range defined by the range and resolution of the spectrometer used. A film with an interference path length of any given size will generate interference across the spectral range under analysis; however, the degree of interference will be determined by how in or out of phase the reflected waves of a particular wavelength become. Therefore, the spectrum obtained in a white light interferometer will be composed of a number of fringes of differing sizes, the largest of which will be for those values of n that are simplest to resolve. The thickness of a layer can be reliably determined via a Fourier transform of the data to give the frequency of the fringes. A further advantage of white light interferometry is that the data collected is sufficient to allow for the measurement of multiple interfering layers and the resolution of the individual thickness of those layers with a single measurement.

Generally, in white light interferometry detection, incident light is reflected from each surface in a transparent medium. When the medium in question is a monolayer film the "surface" in question corresponds to the front surface and the back surface of the film. In other words, there are two reflectant surfaces in such a monoweb film. When the medium in question is a multi-layer polymeric film, each "surface" in question corresponds to each layer in the multi-layer film, for example the top, bottom and middle surfaces of a three-layered film. In the method of the invention, the detection technique is applied to an article on which a monoweb or multi-layered film is provided and in either case the surface of the article itself effectively corresponds to a surface, for detection purposes.

From a second aspect the present invention provides a method of authenticating the provenance of an article marked with a transparent polymer film comprising measuring the birefringence of a core layer in the film.

Birefringence, or double refraction, is a property of materials caused by differences in the refractive indices of the material for the two different polarisations, s– and p–. The resulting effect manifests itself as a rotation of the polarisation angle of light being transmitted through the material; the effect is initiated via an interfacial interaction and propagated through the birefringent material; the degree of birefringence observed is a product of the initial interfacial interaction (i.e. the angle of incidence) and the subsequent path length through the material.

Thus, according to a first aspect of the present invention, there is provided a method of authenticating an article including a monoweb or multi-layer transparent polymer film thereon comprising measuring the thickness of the film or of a layer within the film by white light interferometry and/or measuring the birefringence of a layer therein.

Preferably the article is a moulded article.

Preferably the article is marked with the polymer film by labeling of the film onto the article. Preferably, such labeling is effected by an in-mould labeling process. Alternatively, or as well, the article is marked with the polymer film by decorating the article with the film. Preferably, such decoration is effected by an in-mould decoration process. Alternatively, the article is marked with the polymer film by overwrapping the article with the film.

Preferably the measurement is made on a core layer of the film, in the event that the film is a multi-layer film.

Thus, in a preferred method according to the invention, the article is labeled or decorated with the film, preferably by way of an in-mould labeling or decorating process. Consequently, the detection surfaces include each layer or each surface of the film and the surface of the article on which the film is labeled.

In the case of a normal label (i.e. not an in-mould label), there will generally be an adhesive layer between the film and the labeled article. The optics of the adhesive layer may affect reflection from the surface of the labeled article, or from the surface of the film adjacent the adhesive layer, therefore influencing the overall thickness measurement.

Even in the absence of an adhesive layer, it has generally been thought that reflection of light from the surface of an article against which a film which is otherwise capable of authentication (by white light interferometry or birefringence) is placed may interfere with or disguise the signal from the other reflections. A reflective signal from the article surface might be thought to result in an erroneous thickness measurement being returned, confusing the signal being the correct measurement that represents the edge of the film placed against the article, with or without an adhesive layer therebetween.

In-mould labels will have the background fused to the film, giving rise to a thin fusion interface that will encompass both the polymer and the film's bottom surface. The clarity of a signal from light reflected from this surface will therefore be enhanced with respect to an arrangement in which an adhesive layer is interposed between the film and the article, although there will be other factors which influence the clarity of this signal as well—for example the smoothness of the labeled article, its opacity, its matte character and its glossiness. We refer to these considerations in terms of the "background" provided by the article against which the film is positioned, whether as a result of an in-mould labeling process or otherwise. Preferably the surface of the labeled article in the region beneath the label has a gloss of less than 50, more preferably less than 40 and most preferably from about 30 to 40 (measured at ASTM D2457 (@45 degrees). In the case of an in-mould label the gloss of the fusion layer between the film and the labeled article is preferably more than 50, so that a strong signal from the fusion layer results.

The nature of this "background" may have a critical effect upon the reflections returned. Ideally, the reflection from a background should be as low as possible (a matte black would be most advantageous in this connection). However, any reflections from backgrounds that are not part of the film will send unwanted signals that interfere with the signal, and it has been thought that such unwanted signals would compromise authenticiability of the film in an unacceptable manner.

In a detection technique based on birefringence, polarised light enters a birefringent material (in this case the multilayer film), splitting into ordinary and extraordinary rays. The extraordinary ray is retarded with respect to the ordinary ray. Passing through a second crossed polariser, the two rays recombine and may interfere either destructively or constructively to alter the transmission through the polarisers. This can be measured reflectively using a single polariser; the act of reflection alters the orientation of the light so that the single polariser acts as a crossed polariser to itself in reflected mode. For this reason a highly reflective surface at or towards the interface between the film and authenticable article on which it is positioned is desirable. A metallised layer in the film towards or at the interface would be one way of achieving this, although this may not be necessary if the article itself at its surface is of a strongly reflective material.

Techniques for authenticating polymeric films by white light interferometry and/or by birefringence have, as previously mentioned, been disclosed in our WO2009/133390. The method of the present invention rests on the surprising discovery that the authentication signal from such a film is not unduly compromised when that film is juxtaposed against an article to be authenticated with reference to the film, although certainly we find that the technique of in-mould labeling of the film onto the article provides the most superior results.

We have found, separately, with reference to the authentication of polymeric films themselves using white light interferometric techniques that it is possible to differentiate between two different versions of the same film grade using to within an accuracy of 99% in laboratory tests. Previously, such techniques have been considered in connection with the use of polymeric films as security documents, such as bank notes. However, in the event that such accurate authentication could be made to apply more generally to the film when placed over or on an article, in the form of a label for example (or even in an overwrap or graphic arts application) it becomes possible to apply such authentication techniques more generally over a range of commercial products, particularly high value products which demand or favour authentication.

However, such applications differ from banknotes and other types of security document in at least one crucial way: the detection window is not always a clear, free standing structure. In commercial applications, the film is wrapped around products, laminated to other films or glued down or moulded as a label. The articles to which the films are attached act as backgrounds to the films and will therefore have an influence on a reflective analytical technique such as white light interferometry.

It has been observed that adjusting the properties of the articles and the films with which they are marked can improve the accuracy of white light interferometry detection. Preferably, the film with which the article is marked in this aspect of the invention has low haze, high clarity and a smooth surface. The film may also be provided with a roughened bottom surface. A surface at or towards the interface between the film and the article is preferably non-reflective and opaque.

We have exemplified the efficacy of our authentication techniques applied in such circumstances in the experimental section of this specification, by measuring films when in contact with a variety of backgrounds. The films were either loosely placed on the background materials or were glued down using adhesives similar to those used in the labels industry. The subsequent measurements were both recorded as a series of observations and were assessed using techniques similar to those used in WO 2009/133390.

It was previously believed that the authentication system disclosed in WO2009/133390 could only be satisfactorily employed to authenticate films in the absence of an interfering background material to the film. Accordingly, the objects which were reported as being suitable for authentication according to that system (for example tickets, documents, bank notes, or security cards) had no significant interfering backgrounds, it being understood that the reflection or passage of light would be influenced or distorted by the portion of the background object adjacent to the film, which would adversely affect the results obtained.

However, the applicant has now surprisingly identified that the authentication system disclosed in WO2009/133390 can function with reflectant light, even in the presence of a background material, for example in the form of an article to which a multi-layer film is labeled, preferably by way of an in-mould labeling process.

For the avoidance of any doubt, the term "article" as used herein means items which have a substantial thickness and/or three dimensional structure. Examples of articles include moulded parts such as vehicle body panels, components of electronic devices (e.g. cases for laptop computers, mobile telephones and the like), bottles, e.g. for fragrances, cosmetics, medicines and alcoholic beverages, and lenses, e.g. of glasses or sunglasses.

In preferred arrangements of the present invention, the polymer film is positioned on a region of the article having a thickness of equal to or greater than about 0.5 mm, about 1 mm, about 1.5 mm, about 2 mm, about 3 mm, about 4 mm or even about 5 mm.

In preferred arrangements of the present invention, the article is a moulded article. The polymer film may be formed on the moulded article by using techniques known to those skilled in the art. One of the preferred processes for preparing articles which may be authenticated in the methods of the present invention is in mould labeling.

In mould labeling involves the use of plastics film labels which ultimately form an integral part of the moulded product. The process begins by the label being positioned within the mould, for example, against a wall of a mould for injection moulding or for blow moulding or the like. The label is held in place by various means, such as electrostatic forces or vacuum suction and an article is moulded by injecting a mass of melt or by blowing a parison against the mould walls on which the in-mould label is applied The resultant product is a pre-decorated item, such as a container or the like, which may be filled thereafter, or a component part of a vehicular or electronic system. In contrast to glue applied or pressure-sensitive labels which appear above the surface of the article, in-mould labels appear as part of the article, i.e. with little or no adhesive layer between the film and the article to interfere with detection. The in-mould label cannot be removed without causing significant and obvious damage to the moulding.

Effectively, in-mould labeling eliminates the need for a separate labeling process following the manufacture of the article, which reduces labour and equipment costs. It also allows for a relatively uniform, flat surface for detection purposes at the junction between the film and the article.

Obviously, in processes for preparing articles useful in the present invention, the 'label' will not necessarily be a printed, decorative label, but a polymer film which enables authentication of the article.

Thus, in a preferred embodiment of the present invention, the article including a polymeric film which is to be authenticated is prepared by a process comprising the steps of:

placing a polymeric film into a mould for injection moulding, thermoforming, or blow moulding;

holding the label in position;

injecting a melt into, or thermoforming or blowing a preform in said mould so as to bind with the label; and removing the article from the mould.

The label may be placed into the mould by at least one of feeding the label into the mould by means of a belt, the label falling under gravity from a magazine into the mould, and placing of the label by a handling unit, preferably a robot. Use of a robot minimises human error and improves sanitation of the final product.

The invention also provides a process for authenticating the provenance of an article comprising marking the article with a transparent polymer film and then measuring the thickness of the film or of a layer therein by means of white light interferometry or birefringence.

The polymeric film may be produced from a variety of polymers, including polypropylene. The three main methods of manufacturing polypropylene film are the stenter method, the cast method and the bubble method.

In the cast and stenter methods, polymer chips are typically placed in an extruder and heated so that an extrudate is forced out of a slit die onto a chilled roller to form a film (in the case of the cast method) or a thick polymer ribbon (in the case of the stenter method). In the stenter method, the thick polymer ribbon is then reheated and then stretched lengthways (termed the "machine direction") and widthways (termed the "transverse direction") to form a film.

In the bubble method, the polymer is extruded not through a slit die but through an annular die, to form a relatively thick extrudate, in the form of a hollow cylinder or "drainpipe" shape through which air is blown. The annular die is at the top of an apparatus which is typically the equivalent of several stories high (for example 40 to 50 meters). The extrudate moves downwards and is heated sequentially so that it is expanded to form a bubble. The bubble is then slit into two half-bubbles, each of which may be used individually as "monoweb" films; or alternatively the two halves may be nipped and laminated together to form a double thickness film (or the bubble may be collapsed to form a double thickness film). Typically there are three concentric annuli at the die, so that the hollow cylinder is an extrudate of three layers. For example, there may be a core layer of polypropylene with a terpolymer skin layer on one side and another terpolymer skin layer on the other side. In this case the monoweb would consist of three layers with polypropylene in the middle and the double web would consist of five layers because the layer in the middle would be the same skin layer (terpolymer) of each half-bubble. Many other possible arrangements and components are possible, for example in terms of the number of annuli, type of skin layer, type of core layer, etc.

Thus the bubble method results in a thin film (for example 10 to 100 microns thick) by forming a bubble whereas the stenter method results in a thin film by stretching the material. The bubble method results in homogeneously stretched film which is different to and for some purposes advantageous over stenter film. Biaxially Oriented Polypropylene (BOPP) film is made by the bubble process by Innovia Films Ltd., Wigton, UK. In addition to polypropylene, other polymers (eg LLDPE, polypropylene/butylene copolymers) may also be formed as thin films using the bubble process The present invention allows an article to be securitized as is. The particular inherent characteristics of the polymeric film are observed and there is no need to add any further security or identifying features. This identification allows authentication for security purposes and also allows the article's origin to be determined.

Nevertheless, to increase the ease of authenticating articles, they may additionally be provided with conventional security features, including, but not limited to holograms, taggants, 'track and trace' codes, batch codes and the like. These security features may be included in or on the polymeric film, or may be separately included on or in the articles.

The polymeric films referred to herein are generally sheet-form materials, and may be provided as individual sheets, or as a web material which may subsequently be processed (by die cutting for example) to provide sheet or article form materials. When referring to "film" in this specification it is intended, unless expressly provided otherwise, to include films in sheet or in web form.

The film may comprise a polyolefin film, for example polyethylene, polypropylene, mixtures thereof, and/or other known polyolefins. The polymeric film can be made by any process known in the art, including, but not limited to, cast sheet, cast film, or blown film. The film or sheet may be of mono layer or of multi-layer construction. The film may be optionally coated, e.g. with opacifier(s). The film may comprise cavitated or non-cavitated polypropylene films, with a polypropylene core and skin layers with a thickness substantially below that of the core layer and formed for example from co-polymers of ethylene and propylene or terpolymers of propylene, ethylene and butylene. The film may comprise a biaxially orientated polypropylene (BOPP) film, which may be prepared as balanced films using substantially equal machine direction and transverse direction stretch ratios, or can be unbalanced, where the film is significantly more orientated in one direction (MD or TD). Sequential stretching can be used, in which heated rollers effect stretching of the film in the machine direction and a stenter oven is thereafter used to effect stretching in the transverse direction. Alternatively, simultaneous stretching, for example, using the so-called bubble process, or simultaneous draw stenter stretching may be used.

The films used in articles employed in the present invention can be of a variety of thicknesses according to the application requirements. For example they can be from about 5 to about 240 μm thick, preferably from about 10 to about 120 μm thick, more preferably from about 12 to about 100 μm thick, and most preferably from about 14 to about 80 μm thick. Plural layers of films in accordance with the invention may be laminated together to form relatively thick substrates for use as, for example, security cards and the like. The thickness of such laminated structures may be considerably higher than the preferred maximum thickness of the unlaminated film, for example 250 μm or even more.

The film may comprise one or more additive materials. Additives may comprise: dyes; pigments, colorants; metallised and/or pseudo metallised coatings (e.g. aluminum); lubricants, anti-oxidants, surface-active agents, stiffening aids, gloss-improvers, prodegradants, UV attenuating materials (e.g. UV light stabilisers); sealability additives; tackifiers, anti-blocking agents, additives to improve ink adhesion and/or printability, cross-linking agents (such as melamine formaldehyde resin); adhesive layer (e.g. a pressure sensitive adhesive); and/or an adhesive release layer (e.g. for use as the backing material in the peel plate method for making labels). Further additives comprise those to reduce coefficient of friction (COF) such as a terpolymer.

Further additives comprise conventional inert particulate additives, preferably having an average particle size of from about 0.2 μm to about 4.5 μm, more preferably from about 0.7 μm to about 3.0 μm. Decreasing the particle size improves the gloss of the film. The amount of additive, preferably spherical, incorporated into the or each layer is desirably in excess of about 0.05%, preferably from about 0.1% to about 0.5%, for example, about 0.15%, by weight. Suitable inert particulate additives may comprise an inorganic or an organic additive, or a mixture of two or more such additives.

Suitable particulate inorganic additives include inorganic fillers such as talc, and particularly metal or metalloid oxides, such as alumina and silica. Solid or hollow, glass or ceramic micro-beads or micro-spheres may also be employed. A suitable organic additive comprises particles, preferably spherical, of an acrylic and/or methacrylic resin comprising a polymer or copolymer of acrylic acid and/or methacrylic acid. Such resins may be cross-linked, for example by the inclusion therein of a cross-linking agent, such as a methylated melamine formaldehyde resin. Promotion of cross-linking may be assisted by the provision of appropriate functional groupings, such as hydroxy, carboxy and amido groupings, in the acrylic and/or methacrylic polymer.

Clarifying agents may be particularly preferred additives for reducing the haze level of an film applied on an authenticiable article and thereby increasing the signal strength of the film when subjected to white light interferometry, for example. Low haze films may allow the possibility of using detuned white light interferometers to produce a measurable signal with smaller light sources, narrower wavelength ranges (such as emitted by white light LEDs for example) shorter integration times and/or less demanding optical components and sensors.

Accordingly, the invention specifically contemplates the use of a detuned light emitting device and/or a white light LED source in interferometry measurement of an article carrying a film comprising one or more clarifying agents.

Suitable clarifying agents may include diesteric salts of phosphoric acid, such as sodium 2,2'-methylenebis(4,6,-di-tert-butylphenyl)phosphate; salts of mono- or poly-carboxylic acids, such as sodium benzoate and aluminum t-butyl-benzoate; sorbitol derivatives such as dibenzylidenesorbitol or its $C_1$-$C_8$-alkyl-substituted derivatives, such as methyl-, ethyl- or dimethyl-dibenzylidenesorbitol; inorganic additives such as silica, kaolin or talc; or mixtures of two or more thereof. Other suitable clarifying agents, or combinations thereof will be known to the skilled addressee, or with reference to for example the Plastic Additives Handbook, 5th ed.; Zweifel, H., Ed.; Hanser Publ: Munich, 2001.

Some or all of the desired additives listed above may be added together as a composition to coat the sheet of the present invention and/or form a new layer which may itself be coated (i.e. form one of the inner layers of a final multi-layered sheet) and/or may form the outer or surface layer of the sheet. Alternatively some or all of the preceding additives may be added separately and/or incorporated directly into the bulk of the sheet optionally during and/or prior to the sheet formation (e.g. incorporated as part of the original polymer composition by any suitable means for example compounding, blending and/or injection) and thus may or may not form layers or coatings as such.

Such additives may be added to the polymer resin before the film is made, or may be applied to the made film as a coating or other layer. If the additive is added to the resin, the mixing of the additives into the resin is done by mixing it into molten polymer by commonly used techniques such as roll-milling, mixing in a Banbury type mixer, or mixing in an extruder barrel and the like. The mixing time can be shortened by mixing the additives with unheated polymer particles so as to achieve substantially even distribution of the agent in the mass of polymer, thereby reducing the amount of time needed for intensive mixing at molten temperature. The most preferred method is to compound the additives with resin in a twin-screw extruder to form concentrates which are then blended with the resins of the film structure immediately prior to extrusion.

Formation of a film (optionally oriented and optionally heat-set as described herein) which comprises one or more additional layers and/or coatings is conveniently effected by any of the laminating or coating techniques well known to those skilled in the art.

For example a layer or coating can be applied to another base layer by a coextrusion technique in which the polymeric components of each of the layers are coextruded into intimate contact while each is still molten. Preferably, the coextrusion is effected from a multi-channel annular die such that the molten polymeric components constituting the respective individual layers of the multi-layer film merge at their boundaries within the die to form a single composite structure which is then extruded from a common die orifice in the form of a tubular extrudate.

The polymeric film may also be coated with one or more of the additives described herein using conventional coating techniques from a solution or dispersion of the additive in a suitable solvent or dispersant. An aqueous latex, (for example prepared by polymerising polymer precursors of a polymeric additive) in an aqueous emulsion in the presence of an appropriate emulsifying agent is a preferred medium from which a polymeric additive or coating may be applied.

Coatings and/or layers may be applied to either or both surfaces of the film. The or each coating and/or layer may be applied sequentially, simultaneously and/or subsequently to any or all other coatings and/or layers. If a gas-barrier coating is applied to only one side of the sheet (which is preferred) other coatings and/or layers may be applied either to the same side of the sheet and/or on the reverse (other) side of the sheet.

Additionally or alternatively further layers can be provided in the film by coextrusion through a multiple-annuli die, to produce for example two, three, four or more layers in the coextrudate exiting the die.

A coating composition may be applied to the treated surface of sheet (such as the polymer film) in any suitable manner such as by gravure printing, roll coating, rod coating, dipping, spraying and/or using a coating bar. Solvents, diluents and adjuvants may also be used in these processes as desired. The excess liquid (e.g. aqueous solution) can be removed by any suitable means such as squeeze rolls, doctor knives and/or air knives. The coating composition will ordinarily be applied in such an amount that there will be deposited following drying, a smooth, evenly distributed layer having a thickness of from about 0.02 to about 10 µm, preferably from about 1 to about 5 µm. In general, the thickness of the applied coating is such that it is sufficient to impart the desired characteristics to the substrate sheet. Once applied to the sheet a coating may be subsequently dried by hot air, radiant heat or by any other suitable means to provide a sheet of the present invention with the properties desired.

It would also be possible to use combinations of more than one of the above methods of applying additives and/or components thereof to a film. For example one or more additives may be incorporated into the resin prior to making the film and the one or more other additives may be coated onto the film surface.

In a multi-layer polymeric film having at least a substrate layer and a skin layer, the skin layer is preferably ink printable. The skin layer has a thickness of from about 0.05 µm to about 2 µm, preferably from about 0.1 µm to about 1.5 µm, more preferably from about 0.2 µm to about 1.25 µm, most preferably from about 0.3 µm to about 0.9 µm.

The film is preferably made by the bubble process. The bubble process results in films which have balanced orientation, well-defined and uniform thicknesses and other properties (high tensile strength, low elongation, high gloss and clarity, good puncture and flex-crack resistance, resistance to oils and greases, good water-impermeability) which define a "signature" of the film which indicate that it has been prepared by the bubble process.

Previous attempts to securitize polymeric films and articles have included the incorporation of one or more taggants into the film in low concentrations, in an attempt to identify the film by detecting a stimulation response. The present invention allows the assessment and analysis of the information which is inherently and already written into the structure of the film. It is preferable that the identification of the present invention includes identification of a core layer rather than a surface layer, thereby enhancing security by authenticating a layer which is enveloped within the film to the extent that tampering with or manipulation of such layer would be very burdensome and difficult.

In order to differentiate between films (e.g. BOPP films and others) the overall thickness of the film, as well as the thickness of individual layers, for example a laminating layer, may be measured. This allows determination of particular characteristics which are dependent on particular processes, for example a particular bubble process. Additionally, or alternatively, the unique birefringent signature of the film may be assessed and used to determine whether the film was made by a particular process and accordingly whether it is, for example, a genuine bank note or counterfeit. Birefringence depends on the anisotropy of the material and films made by bubble process have different anisotropies and hence different birefringent properties to films made by other processes. Furthermore the precise conditions used in the bubble process will affect the birefringent signature.

Thus the present invention recognises that, rather than needing to add security or identification features, the inherent properties of films made by particular processes, such as the bubble process, are unique and act as a signature.

The authentication processes of the present application, and the devices used for such processes, are generally applicable to a range of polymer film materials, and can be tailored to specific substrates and thicknesses by criteria known in the art. As regards authentication by thickness measurement using white light interferometry, a spectrometer's wavelength range is determined by the line spacing of the spectrometer grating, the length of the detector array and the focal length of the spectrometer optics. The thickness range that can be measured is relative to the size of the spectral range used. In the present invention it is preferred to measure thicknesses of between 0.5 and 100 μm, which corresponds to a spectral range of around 500-1000 nm. Depending on the kind of device used, the desirability of a large spectral range can be balanced against other factors, particularly in small devices. The factors that ideally require balancing in a small device include the spectral range, the spectral resolution and the slit width; these factors determine the thickness range possible, the ability to resolve thin layers and the time taken to obtain a response. In a small device, a large spectral range can be offset by the use of narrower slits so as to obtain satisfactory resolution, sufficient sensitivity and acceptable measuring times. According to the invention, devices may be provided which are specific for authentication of a particular defined thickness.

From a further aspect the present invention provides a detection unit which is designed to carry out the method of the present invention. Such a detection unit is tailored to recognise the characteristics of the specific signature of a secure polymer-based material.

Typically a narrow light beam is directed into the material to be measured, and the detector detects the light reflected from the boundaries between the layers. A series of peaks are obtained in an interferogram, showing the location of the corresponding layers. Thus it is possible quickly to inspect articles including multilayer films and webs, without needing to contact or destructively analyse the article.

The orientation in polymers not only affects properties (mechanical, optical, barrier, and others) but also affects the birefringence due to anisotropy in the refractive indices. Birefringence is the separation of light into two rays caused by such anisotropy and is clearly a function of the process of preparation of the film. For example, BOPP films produced by the bubble process have a particular anisotropic character due to the uniform stretching.

The film is preferably a collapsed bubble film, i.e. contains two half-bubbles laminated together. The lamination layer is preferably a terpolymer.

The invention will now be more particularly described with reference to the following non-limiting Examples.

Examples

A number of multi-layer film samples were selected for experimental testing, namely:

1. C58 film (control)—a clear uncoated, high gloss biaxially oriented polypropylene (BOPP) film of 58 micron thickness available commercially for label facestock applications from Innovia Films Ltd under the trade mark Rayoface C. (Referred to as "Normal" in Table 1)

2. A modified C58 film containing in its core layer 1.2% of a clarification agent. (Referred to as "Clarified" in Table 1)

3. CZPA56 film—a clear top coated high gloss biaxially oriented polypropylene (BOPP) film of 56 micron thickness with enhanced squeeze-ability by virtue of a modified core layer available commercially for label facestock applications from Innovia Films Ltd under the trade mark Rayoface CZPA. (Referred to as "Label" in Table 1.

Samples of the three films were compared using a white light interferometric technique measuring at 100 ms integration time and against the following backgrounds:
a. Clear PET film, >100 μm thickness
b. Glass slide
c. Matt black card
d. Glossy black magazine
e. Glossy yellow
f. White blank paper Both the normal and the clarified C58 were either placed on top of each background or were gummed down using a pressure sensitive adhesive similar to that used in the labels industry. The CZPA56 labels were supplied with adhesives already applied, which had the advantage of producing a much smoother and optically clear adhesive layer than the laboratory made samples.

In addition to these tests, some C58 labels in-mould laminated to blue and clear polypropylene, forming label film coated polymer disks in the process, were prepared.

Results

All the backgrounds under consideration could be measured using the white light interferometer; the effects upon the results were noticeable, but not severe in most cases.

No Adhesive

Glass.

The signal wanders unless the film is pulled tight and the probe pressed down hard onto the sample—this is probably due to the low levels of friction between the materials allowing the sample to slide. Non-clarified film returned a poor signal that was difficult to find, clarified returned a good signal.

PET.

Same as with glass.

White.

Overall signals were good; non-clarified has a weak central layer signal.

Black Matte.

Slightly enhanced results.

Black Glossy.

As white.

Yellow Glossy.

Noisy, but strong signal.

With Adhesive

Glass.

Reduced outer layer signal (difficult to resolve for non-clarified), central layer signal enhanced. Can be read from the reverse, through the glass and adhesive.

PET.

For PET less than 90 µm, the Verus device measures the PET rather than the BOPP film. PET greater than 90 µm returns a good signal.

Black Matte.

Enhanced signal.

All Others.

Slightly reduced signals.

In-Mould Label

The signals were good and returned both inner and outer layers (although the outer layer signal strength was somewhat reduced).

Clarified samples were unavailable for this test.

The results obtained demonstrate the ease by which a signal can be obtained using a white light interferometer. A numerical method of assessing the quality of the reading was developed in order that the efficiency of the process could be more accurately assessed. Two metrics were developed: the Deviation and the Quality.

The Deviation is the calculated average size of the interference fringes over the wavelength range used in the thickness calculation. The Deviation value is generated via the use of a polynomial curve fitting technique to follow the average shape of the reflection data, from which the degree to which the actual data deviates from the shape of the curve is calculated.

The Quality is calculated by comparing deviation between the curve fitting polynomial and a custom moving average function.

A high value of deviation is desirable, since that shows large interference fringes. Low values for Quality are preferable (since that shows a good agreement between the two curve fitting techniques), a value of less than 0.6 is the approximate limit between good and bad quality. The Deviation value is not reliable if the quality value exceeds this as the deviation from the polynomial will reflect the inaccuracy of the polynomial technique rather than the height of the interference signal.

It should be stated here that all the readings taken represent positive results in the interferometer and that the Quality values are measurements of the limits of the assessment technique which is nonetheless reliable for the majority of examples.

The results of these experiments are reported in Table 1:

TABLE 1

Summarised deviation and quality results.

| Background | Gum? | Film | Deviation Max | Deviation Min | Av Quality |
|---|---|---|---|---|---|
| White | Y | Clarified | 104.73 | 39.16 | 0.31 |
| | Y | Normal | 31.24 | 14.55 | 0.60 |
| | Y | Label | 22.18 | 16.15 | 0.84 |
| | N | Clarified | 322.06 | 118.29 | 0.50 |
| | N | Normal | 166.76 | 69.22 | 0.72 |
| Glass | Y | Clarified | 71.76 | 27.56 | 0.48 |
| | Y | Normal | 136.78 | 13.80 | 0.65 |
| | Y | Label | 16.49 | 10.24 | 0.68 |
| | N | Clarified | 477.40 | 136.58 | 0.58 |
| | N | Normal | 1070.82 | 341.68 | 0.95 |
| PET | Y | Clarified | 164.57 | 14.63 | 0.53 |
| | Y | Normal | 84.56 | 8.74 | 0.48 |
| | N | Clarified | 287.57 | 108.80 | 0.49 |
| | N | Normal | Signal too poor | | |
| Black | Y | Clarified | 61.44 | 45.85 | 0.77 |
| | Y | Normal | 55.29 | 38.69 | 0.80 |
| | Y | Label | 57.18 | 44.53 | 0.92 |
| | N | Clarified | 330.34 | 156.38 | 0.12 |
| | N | Normal | 159.58 | 32.25 | 0.39 |
| Glossy Black | Y | Clarified | 142.32 | 47.78 | 0.57 |
| | Y | Normal | 54.29 | 39.80 | 0.88 |
| | Y | Label | 57.27 | 51.83 | 0.91 |
| | N | Clarified | 399.98 | 47.78 | 0.34 |
| | N | Normal | 474.78 | 105.40 | 0.69 |
| Glossy Yellow | Y | Clarified | 26.26 | 17.07 | 0.77 |
| | Y | Normal | 40.42 | 18.00 | 0.79 |
| | Y | Label | 30.57 | 14.85 | 0.83 |
| | N | Clarified | 312.94 | 190.41 | 0.44 |
| | N | Normal | 394.58 | 102.77 | 0.85 |
| In Mould | | Blue | 34.41 | 33.85 | 0.93 |
| | | White | 35.46 | 18.61 | 0.91 |

It will be seen that clarified films tend to perform better than their non-clarified counterparts, but that even non-clarified film may be detected well against certain backgrounds, the white, black, yellow and in-mould variants being the better performing backgrounds in most cases.

The presence or absence of the adhesive layer has a significant impact on signal quality, the absence of adhesive being preferred. However, it should be stressed that all the adhesive samples in this trial were manufactured by hand and are therefore more likely to contain optical defects than a machine applied label (defects may also be caused by the use of a hazy gum which would be undesirable to the labels industry).

The In-mould samples were both readable and produced similar results that were influenced most heavily by the deformations on the laboratory samples. It would appear that white light interferometry may be used effectively to obtain readings capable of authentication from the in-mould label samples.

It would also appear that similar techniques may be used in connection with the authentication of articles overwrapped with polymeric film.

The invention claimed is:

1. A method of authenticating the provenance of an article marked with a removable multilayer polymer film, comprising at least one of:
  measuring the thickness of one or more transparent layers within the removable multilayer polymer film whilst still located on the article by white light interferometry; and
  measuring birefringence of the removable polymer film whilst still located on the article or of a layer within the film whilst still located on the article, wherein a surface at or towards the interface between the film and the article is non-reflective and opaque.

2. The method of claim 1, comprising:
presenting the article marked with the removable polymer film to a detector;
illuminating the article marked with the removable polymer film with light from the detector such that light from the detector passes into the removable polymer film; and
detecting, by way of the detector, light reflected back towards the detector from at least one of:
the surface of at least one transparent layer within the removable polymer film itself; and
the surface of the article marked with the removable polymer film.

3. The method of claim 1, wherein measurement is carried out using at least one of: a detuned light emitting device; and a white light LED source.

4. The method of claim 1, wherein at or towards the interface between the film and the article, the removable polymer film has a roughened bottom surface.

5. The method of claim 2, wherein the step of detecting comprises detecting light reflected back towards the detector from the surface of the at least one transparent layer within the removable polymer film itself.

6. The method of claim 2, wherein the step of detecting comprises detecting light reflected back towards the detector from the surface of the article marked with the removable polymer film.

7. The method of claim 1, wherein the article is a moulded article and wherein no adhesive layer is present between the article and the film.

8. The method of claim 1, wherein the removable polymer film is transparent.

* * * * *